United States Patent [19]

Benham

[11] 3,935,738
[45] Feb. 3, 1976

[54] LIQUID LEVEL DETECTING DEVICES

[75] Inventor: Hugh Michael Benham, London, England

[73] Assignee: ABTEC Limited, London, England

[22] Filed: Jan. 14, 1974

[21] Appl. No.: 433,408

[30] Foreign Application Priority Data
Jan. 19, 1973 United Kingdom................. 2903/73

[52] U.S. Cl.................. 73/295; 116/109; 340/244 R
[51] Int. Cl.²......................................... G01F 23/22
[58] Field of Search.................. 73/295, 290 R, 291; 340/244 R; 116/109, 118 R

[56] References Cited
UNITED STATES PATENTS

| | | | |
|---|---|---|---|
| 2,091,319 | 8/1937 | Howse et al.................... | 116/109 X |
| 2,632,419 | 3/1953 | Topping........................... | 116/109 X |
| 3,048,036 | 8/1962 | Van Ham......................... | 73/290 R |
| 3,132,514 | 5/1964 | Plessinger............................ | 73/295 |
| 3,512,412 | 5/1970 | Weining................................ | 73/295 |

FOREIGN PATENTS OR APPLICATIONS 447,843  4/1948  Canada................................ 73/295

*Primary Examiner*—Richard C. Queisser
*Assistant Examiner*—Joseph W. Roskos
*Attorney, Agent, or Firm*—Oblon, Fisher, Spivak, McClelland & Maier

[57] ABSTRACT

A liquid level detecting device for vapour generators is characterized by a stack tube for connection to the vapour generator and preferably two separate side tubes in the form of loops each having an upper vapour inlet to the stack tube and a lower outlet disposed respectively at a low water level and a high water level. In use the loops fill with cooled condensate. When the water level moves past either of the cooling tube outlets the condition of that tube is disturbed, and the cooled water is displaced from one portion of the loop to another and steam occupies the previously cooled portion of the tube. The temperature change is sensed and used to give an alarm.

13 Claims, 23 Drawing Figures

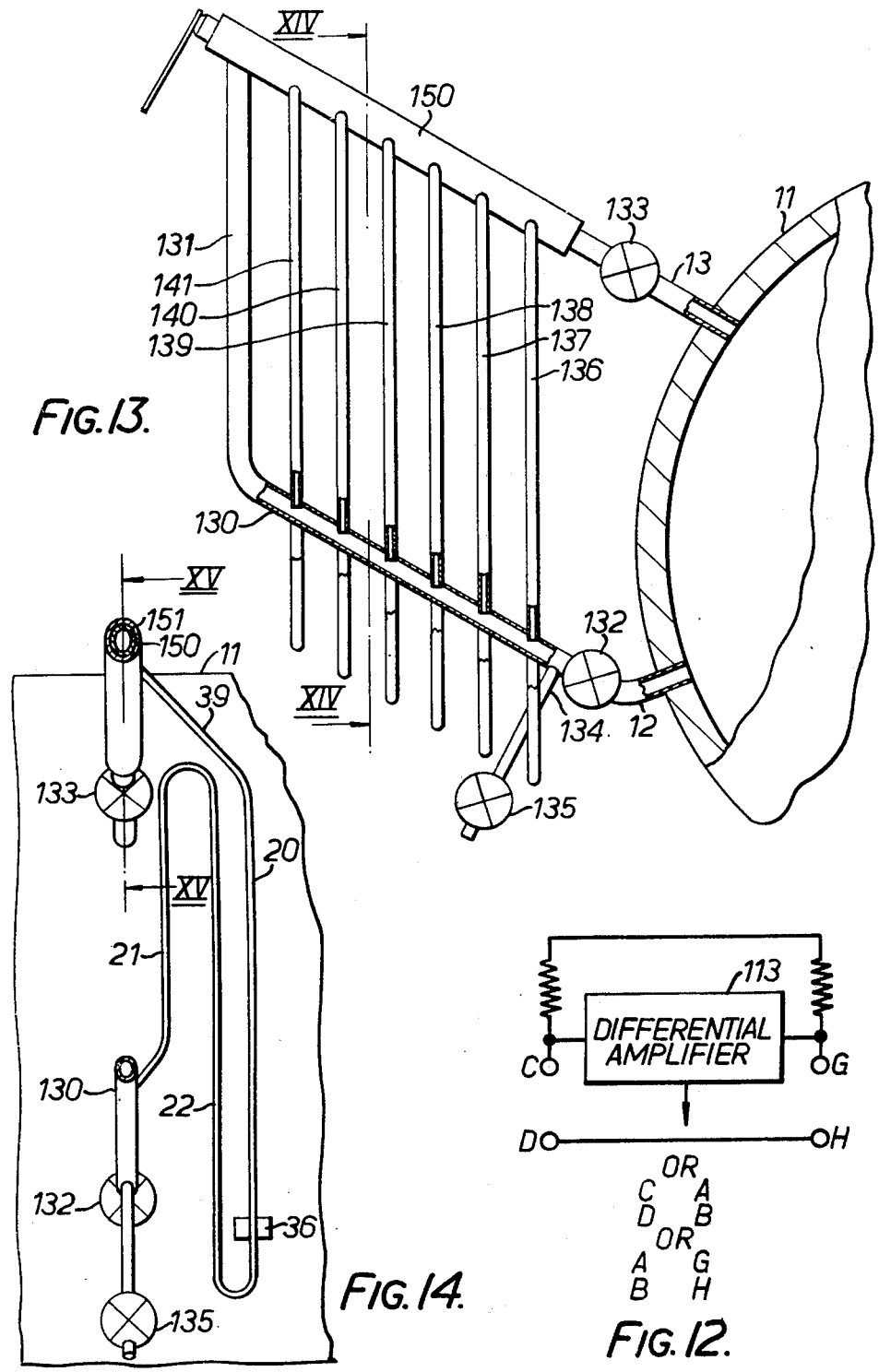

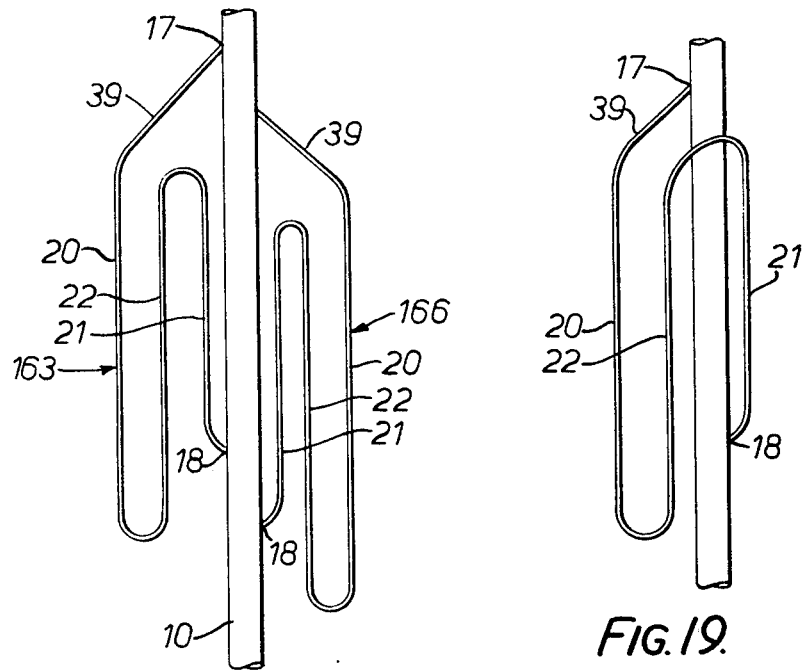
FIG.18.
FIG.19.
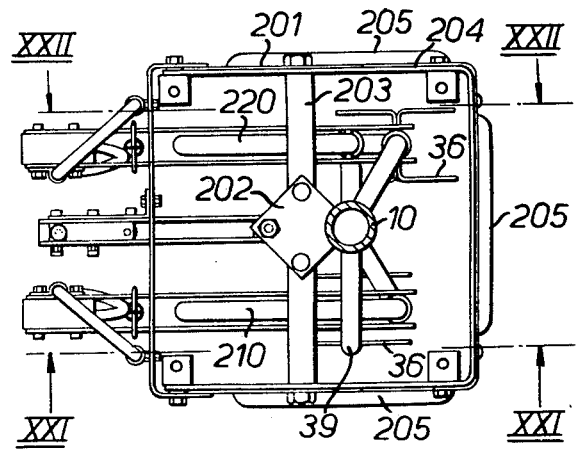
FIG.20.

LIQUID LEVEL DETECTING DEVICES

BACKGROUND OF THE INVENTION

The present invention relates to alarm devices for vapour generators. The device is particularly adapted to detect when the liquid level in the generator moves past a predetermined level and then produce a signal.

The invention will be described with particular reference to devices for detecting and signalling water level changes in steam boilers. However it will be appreciated that the device could be used equally well in systems where the working fluid is other than water.

The device finds particular use in the provision of alarm devices for giving a warning of high and/or low level conditions in steam boilers operating at high pressure, e.g. at 2500 p.s.i., though it is also useful for low pressure boilers as well.

The provision of high and low level alarms for high pressure water boilers presents a number of problems. Float or displacement alarms, which may be sufficient (though still having some defects) for low pressure boilers, and which are used to actuate steam whistles or electrical warning devices are not satisfactory in high pressure uses. The float may have to be too substantial and the float chamber too massive to be practical. Steam density increases with pressure but that of the water decreases so that the differential force available to operate the float diminishes. Steam whistles suffer from the needle valve seat becoming scored as a result of the high pressure drop, causing a permanent leak-off. Magnetic relay systems have to be safeguarded against loss of magnetism due to overheating and also the mechanism becoming fouled, caused by the magnet's attraction for any iron oxide or iron particles in the boiler water.

Instrument type sensing devices depending upon the differential pressure between a static head and that in the boiler drum are equally affected by the small difference between the densities of high pressure steam and water. In the case of a boiler operating at about 2500 lb. per sq. in., for instance, the 1 inch change of water level to which an alarm would be expected to respond represents a change in head equivalent of only 0.015 lb. per sq. in. A very delicate instrument would be required to record a pressure change of this order.

Thermostatic water level alarms have been proposed, e.g. in British Patent Specification No. 608867, but have not been satisfactory. Such arrangements use inclined metal expansion tubes of various shapes, connected to the boiler drum in the same manner as the gauge glass, so that any movement of the water level is transmitted to the tube. When the boiler level rises, water rising in the tube cools it, causing contraction. When the level falls, the tube contains more steam and expanded with a consequent temperature rise. This expansion and contraction is multiplied by leverage and applied to a micro switch or similar device which operates an electric bell or siren, and indicator lights.

The main defects in systems such as these is inadequate temperature difference between steam and water in the tube. Continuous condensation in the upper part of the tube drains down and raises the water temperature close to that of the steam. To sound the alarm at high water level, therefore, it is expected to contract a tube heated to steam temperature by using very hot condensate as the cooling medium. This condition would become worse at the higher boiler pressure where greater heat dissipation due to higher temperature coupled with the reduced latent heat would promote an even greater rate of condensation.

A secondary problem to be solved arises from the fact that steam temperature changes with steam pressure, so a pressure change would affect the mean temperature of the expansion tube in the same way as a water level change. Therefore, unless some form of compensation was incorporated in the mechanism, the alarm would need to be readjusted whenever the boiler pressure varied outside the narrow set limits.

SUMMARY OF THE INVENTION

It is thus an object of the present invention to provide an improved water level alarm device able to operate more reliably at high pressures than alarms hitherto proposed.

It is a further object to provide an alarm which has increased sensitivity and is less liable to variation in operation with variation in steam pressure.

The invention is based on the detection of whether the liquid level in a vessel containing a heated liquid with its associated vapour is above or below a set point by uitlizing the thermostatic action derived by comparing the established temperature of the saturated vapour with that of a quantity of cooled liquid.

This is achieved by means of a stack tube communicating with the boiler above and below the water level. The stack tube has a side loop attached therein with upper and lower inlets, the lower inlet being either at the desired low water level or at the desired high water level. The arrangement is such that the lower portion of the loop under normal conditions fills with water by reason of steam condensing therein via the stack tube and upper inlet. The dimensions of the loop are such that the water cools radiatively faster than it is heated by the steam condensing in therein.

If the water level rises or falls in the stack tube, the stable condition is disturbed and the cooled water moves rapidly by a type of syphonic action from one portion of the loop to another. Thus, the previously hot steam filled portion of the tube is rapidly cooled and the previously cold water filled portion of the loop is rapidly heated by steam condensing therein. The large change in temperature is sensed by suitable means and gives a rapid response to change in water level. The system moves from one stable state to another stable state and may be likened to a "flip-flop" device.

Thus, according to the present invention, a liquid level detecting device, adapted for use with a vapor generator which comprises a tube which in use is partially filled with liquid and partially filled with vapour, such that changes in water level cause the tube to expand or contract with the movement of the tube being arranged to actuate a warning device, is characterized in that the device comprises a stack tube having a lower liquid inlet and an upper vapour inlet for attachment to the vapour generator, and at least one cooling tube communicating with the stack tube at an upper cooling tube inlet above or below the stack tube vapour inlet, and at a lower cooling tube outlet above the stack tube liquid inlet, each cooling tube changing direction at least twice between its inlet and outlet, the total change in direction preferably being at least 360°, so as to provide at least first, second and third, preferably generally aligned, e.g. parallel, portions of the cooling tube and a collecting region for the liquid in which the liquid can cool, the region being located between the said first and second portions of the cooling tube and at least one sensing device located at or in at least one of the first, second or third portions, such portion being one which, when the device is in use, will contain the working medium in one physical state under normal conditions and in another physical state under alarm conditions, the device being arranged so as to sense the change in the physical state of the working medium in the that portion of the cooling tube.

The sensing device can be a temperature sensor, e.g. a thermocouple, or more simply, at least one member attached to a portion of the coolant tube, e.g. pivoted to at least one of the aligned portions of a coolant tube, such portion being one which, when the device is in use, will contain the working medium in one physical state under normal conditions and in another physical state under alarm conditions, the member being arranged so as to actuate a signal device or a control device or both when the point at which it is attached to the coolant tube changes its position due to expansion or contraction of such portion of the tube.

The stack tube is usually inclined at an angle to the horizontal and in the simplest forms of the device is preferably arranged vertically. However, in other forms, it may be inclined or have an inclined lower limb and a vertical or more nearly vertical middle or upper limb.

The device may be used to detect rises in water level above an upper limit by mounting the device, e.g. adjustably in the vertical plane, on or in relation to a boiler drum or vapour generator tank so that the normal water level is below the or a lower coolant outlet tube, which is located at the required high water level. In order to provide a low water level warning, another coolant tube may be provided with its lower coolant outlet tube below the normal water level in the boiler drum, this lower coolant tube being located at the required low water level. Clearly, if desired, the two coolant tubes could be provided merely by identical forms of the device separately mounted at the different levels. The bottom of each stack tube would be connected to the boiler drum below the low water level and the top of each stack tube would be connected to the boiler drum above the high water level by suitable piping, e.g. with releasable connectors, if desired.

The pivoted member preferably operates a switch to generate a signal or actuate a control circuit on movement of the member. The switch may be mounted on a fixed position, e.g. on the boiler, stack tube or independent location, but is preferably mounted on another member or arm pivoted to the same two bodies to which the first member or arm is pivoted.

In a further alternative arrangement an arm or other actuator is attached to the coolant tube and arranged to make and break contact with a fixed switch in accordance with the heating or cooling of the coolant tube.

The pivots are preferably located at or adjacent one end of the arms and the switch at the other end. The pivots intermediate the end pivots and the switch are preferably closer together than are the end pivots so as to compensate for temperature variations. Alternatively, the body carrying the outer pivots can be arranged to have a higher coefficient of expansion than the body carrying the intermediate pivots.

One of the arms preferably has adjustable actuating means for actuating the switch so that the amount of movement or relative movement of the arms required to actuate the switch can be adjusted.

The arms preferably are pivoted on a pair of bodies which in either mode of operation, either high level or low level, will have widely different temperatures and which when the water level passes the upper or lower limit will switch the temperature conditions from that obtaining under normal conditions.

The external pivots of each arm are desirably pivoted to one of the bodies at spaced apart points such as to achieve a significant movement, e.g. 2 cms at the other end of the arms, when a temperature change of 100°C occurs in the length of the body between the pivots, in cooperation with the spacing of the two intermediate pivots. These two pivots are spaced apart on the other of the bodies. In an alternative arrangement, the intermediate pivots are located on a body which does not change temperature during the cycle, e.g. the stack tube (though of course, it will change with working pressure). Here the movement of the arms is derived entirely from the outer pivots. The stack tube or other body is preferably made of the same material as the loops. Thus it compensates for any variation in steam pressure and thus temperature.

Clearly, if desired, a fixed pivot, e.g. an external bracket, could be used for either the intermediate or end pivots.

In an alternative form of the invention, at least two cooling tubes are provided and a valve device is provided for selectively connecting the upper cooling tube inlet of each cooling tube to the vapour inlet of the stack tube, while shutting off the stack tube from the vapour inlet and a drain, provided with a valve, is located below the lower cooling tube outlet.

The valve device may comprise a valve manifold housing an inner sleeve open at one end to the vapour inlet of the stack tube and having one series of ports such that, in one position of the sleeve, the vapour inlet of the stack tube is brought into communication with the stack tube and all the cooling tube inlets, while in other positions, the vapour inlet of the stack tube is brought into communication with only one of the upper cooling tube inlets in each such other position.

The stack tube may have an inclined lower limb affixing the lower liquid inlet, a vertical intermediate limb, e.g. communicating with the valve device affording the upper vapour inlet, and at least two cooling tubes disposed between the lower limb and the upper portion of the device, e.g. the valve device.

In a preferred modification of the invention the circuitry of the alarm devices controlled by the sensing devices are under the control of a further sensing device which activates the circuitry only when the stack tube contains steam.

BRIEF DESCRIPTION OF THE DRAWING

The invention may be put into practice in various ways and a number of specific embodiments and modifications thereof will be described by way of example with reference to the accompanying drawings, in which

FIGS. 9 to 12 are diagrammatic illustrations of alternative ways of sensing the change in state of the cooling tubes in which platinum wire coils are used;

FIG. 9 shows the positioning of the coils and FIGS. 10 to 12 show alternative electrical circuits for producing an output signal;

FIGS. 13 to 15 are diagrammatic illustrations of a modified form of device in which a number of side tubes are provided communicating with a modified form of stack tube which has provision for selectively blowing down the cooling tubes with steam from the boiler;

FIG. 13 is a side elevation of the modified form of device;

FIG. 14 is a diagrammatic cross section of the device taken on the line XIV — XIV of FIG. 13 showing only one of the cooling tubes for clarity;

FIG. 15 is a diagrammatic cross sectional view of the valve portion of the top of the stack tube taken on the line XV — XV of FIG. 14;

FIGS. 16 to 18 are diagrammatic illustrations of a further modified form of device in which a vertical stack tube is provided with a number of radially disposed cooling tubes which preferably are provided with sensing devices such as shown in FIGS. 9 to 12 rather than levers as shown in FIGS. 1 to 9;

FIG. 16 is a diagrammatic plan view;

FIG. 17 is a highly diagrammatic illustration of the way in which the lower ends of the cooling tubes enter the stack tube at varying levels, (the tubes should be radially disposed but are illustrated in this manner for the sake of clarity);

FIG. 18 is a diagrammatic view showing only two of the cooling tubes taken on the line XVIII — XVIII of FIG. 16;

FIG. 19 is a diagrammatic view of a further modified shape of cooling tube;

FIGS. 20 to 23 are approximately scale views, approximately one quarter full size, of one preferred embodiment of the invention;

FIG. 20 is a plan view taken on the line XX — XX of FIG. 21;

FIG. 21 is a side elevation taken on the line XXI — XXI of FIG. 20 showing the high level alarm cooling tube loop;

FIG. 22 is a side elevation taken on the line XXII — XXII of FIG. 20 showing the low level alarm cooling tube loop; and FIG. 23 is a front elevation of the device showing the microswitches with the front hinged cover removed.

DETAILED DESCRIPTION OF THE PREFERRED EMBODIMENTS

Figure 1:
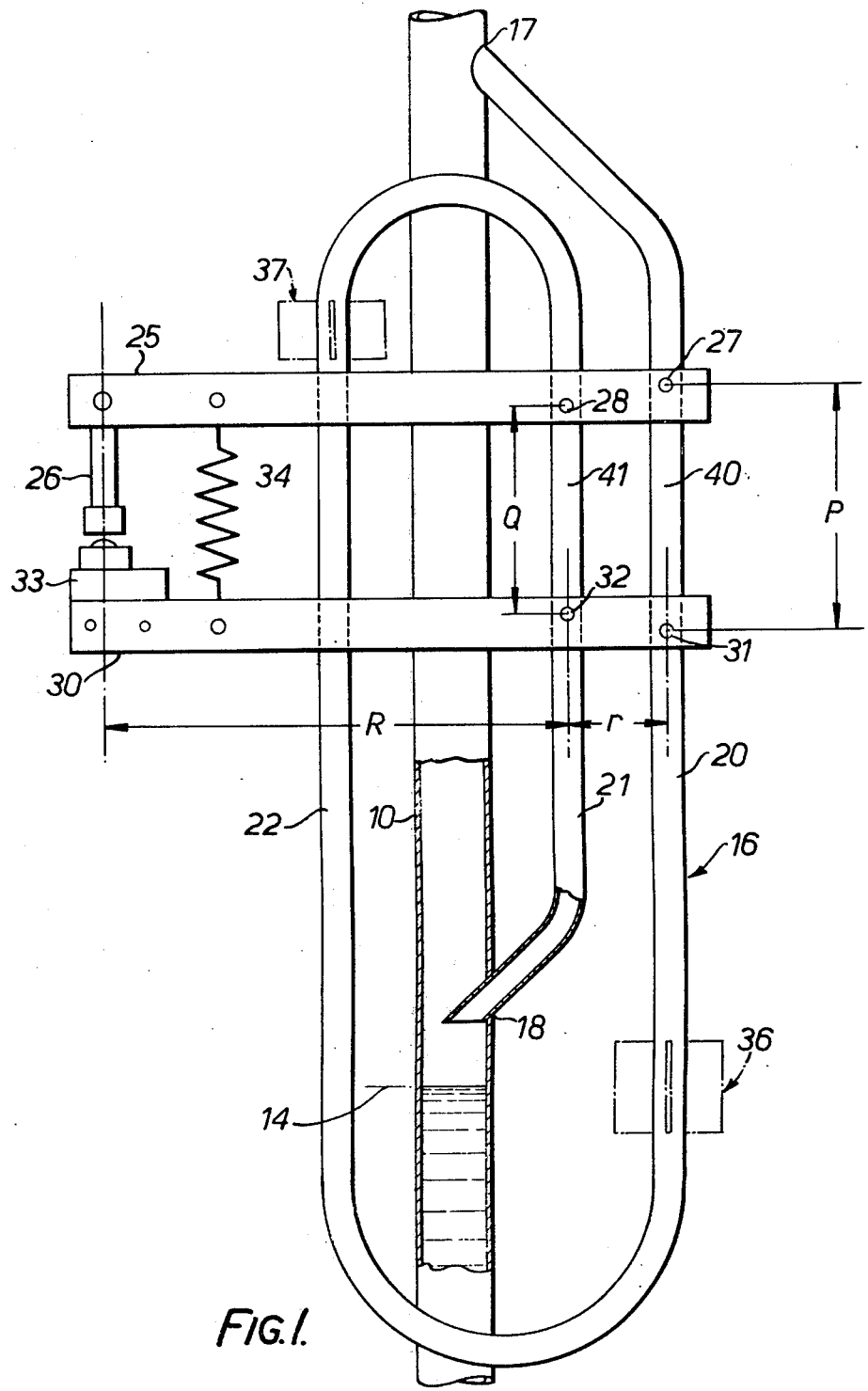
FIG. 1 is a part sectional front elevation of one form of alarm device in accordance with the invention.
Figures 2, 3:
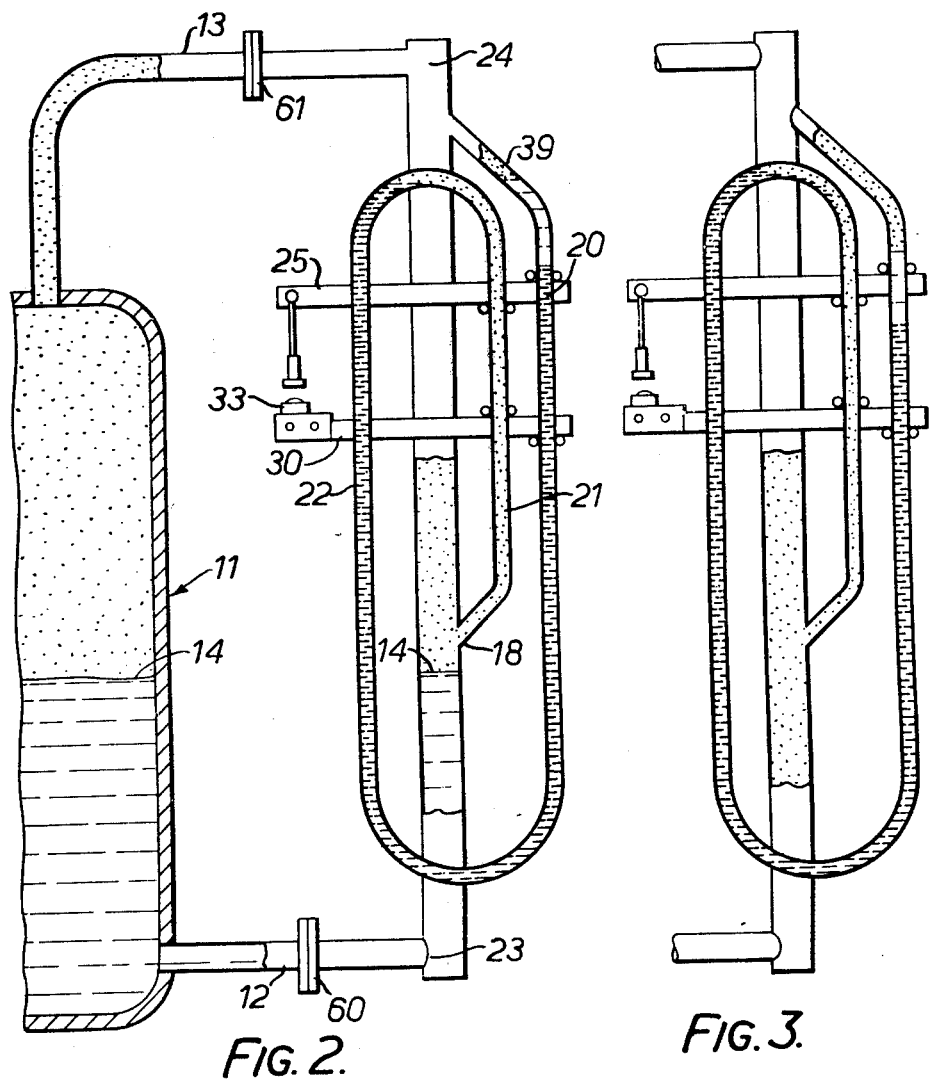
FIGS. 2 to 5 show part sectional front elevations of the embodiment shown in FIG. 1 demonstrating various stages in the operation of the device.

FIGS. 1 and 2 show the invention as applied to an alarm device to give warning of high and low water level in a steam generator or boiler. A stack tube 10 with a lower liquid inlet 23 and an upper vapour inlet 24 is mounted in a vertical or near vertical position adjacent to the boiler drum 11 from whence it receives water through a pipe 12 provided with a suitable connector, e.g. a flange or butt welded joint 60, from the bottom of the stack tube to a point below the water level 14 in the drum 11 and steam through pipe 13 provided with a similar joint 61 from the top of the stack tube 10 to a point an adequate distance above the water level in the drum. The water level 14 in the drum 11 is thus set up also in the stack tube 10.

Referring further to FIG. 1, a length of metal tube 16, preferably of smaller diameter, e.g. ⅜ inch internal, than the stack tube 10 which for example, has an internal diameter of 1 inch, is formed into a loop and connected to the stack tube 10 at an upper point 17 and a lower point 18, forming three generally vertical or parallel columns 20, 21 and 22, and thus a form of syphon tube. The lower end of the loop is preferably located below the low water level and although this is not essential, we have found it much to be preferred. An upper lever 25 carries an adjustable tappet 26 at one end and is attached to the columns 20 and 21 by means of pivoted joints 27 and 28 at its other end. Similarly, a lower lever 30 is pivoted to the columns 20 and 21 at points 31 and 32 at one end and carries at its opposite end an electrical switch 33 which is juxtaposed to the tappet 26 carried by the arm 25. A tension spring 34 is included to improve the mechanical operation and reduce lost motion (alternatively weights could be used to draw the arms together). Cooling fins 36 may be attached in heat exchange relationship to the column 20, e.g. at its lower end, and cooling fins 37 may be similarly attached to the upper end of the column 22. These fins enhance the temperature change by promoting greater heat radiation from the sections of the loop which are always filled with water.

The operation of the device in order to give a warning of a high water level condition will now be described. In this mode of use, the alarm is mounted as shown in FIG. 2 in relation to the boiler drum 11 so that when water in the boiler drum 11 reaches the high level limit, the level in the stack tube 10 will have risen to the point 18. So long as the water level in the stack tube 10 is below the point 18, as indicated in FIG. 2, steam from the boiler drum 11 will enter the loop of tubing 16 and condense into water through heat loss to atmosphere via. the tube wall. As a result, the columns 20 and 22, of the loop will fill with water up to the top of the upper bend, i.e. the top of column 22, as shown in FIG. 2.

Once the U-tube which is formed by the columns 20 and 22 has filled with condensate, the latter will become almost cold due to continuing radiation of heat to atmosphere. Only a small amount of hot condensate will drain into column 20 due to the short angled length 39 of steam filled tube at the top of column 20. Condensation of steam in the center of column 21 will drain back into the stack tube 10 through the entry at 18 and will be replaced by fresh steam at the same point.

So long as the water level remains below the point 18, the alarm system is in a quiescent or steady state, as indicated in FIG. 2, with column 20 filled with cool water and the center column 21 filled with hot steam. In this condition, the tappet 26 is adjusted so as to remain clear of the operating button of the switch 33.

When the water level rises above the point 18, steam in the center column 21 becomes sealed off from the steam supply in the stack tube 10. As indicated in FIG. 3, condensing steam in 21 cannot be replaced and the resulting fall in pressure causes water to be drawn up the column 21 through the entry 18 and causes cool water to spill over from the column 22 in to the column 21. The flow of water from 22 into the steam trapped in column 21 will absorb much of the heat in the latter and accelerate its condensation into water. The reduction in volume of the trapped steam in 21 must also be accompanied by a descent of the water in column 20 since this is subjected to the full steam pressure of the boiler drum 11 via the pipe 39 and 13. Thus a rapid movement of water occurs akin to a syphon action.

Figure 4:
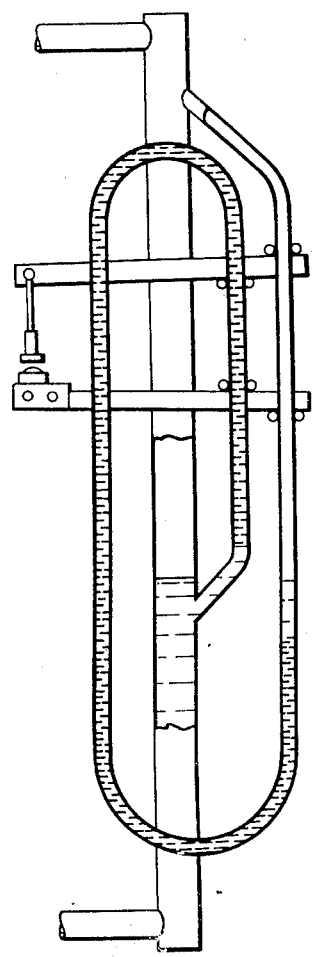

When all the steam in the center column 21 has been condensed, the new state of equilibrium is established, as indicated in FIG. 4.

The water level in column 20 has now fallen to the same level as that in the stack tube 10 so that the section 40 between the pivot points 27 and 31 which was formerly filled with cool water, is now filled with hot steam. Hence expansion of this portion of column 20 will take place due to the rise in temperature of the metal tube 20.

The center column 21 which was filled with steam, has now filled with relatively cool water, much of which has spilled over from the column 22. Contraction occurs due to cooling of the section 41 of the metal tube 21, which is between the pivots 28 and 32.

The expansion and contraction of the two sections of tube 20 and 21 is combined and multiplied by the levers 25 and 30, thus closing the gap between the tappet 26 and the switch 33, which can be opened or closed in an electrical circuit containing any combination of warning devices required, such as the illumination of a red warning light, the sounding of an electric bell, or any similar warning, or could be directly connected into the control circuitry for the boiler.

The alarm causes action to be taken to adjust the water level in the boiler, e.g., by reducing the flow rate of the water feed to the boiler.

Figure 5:
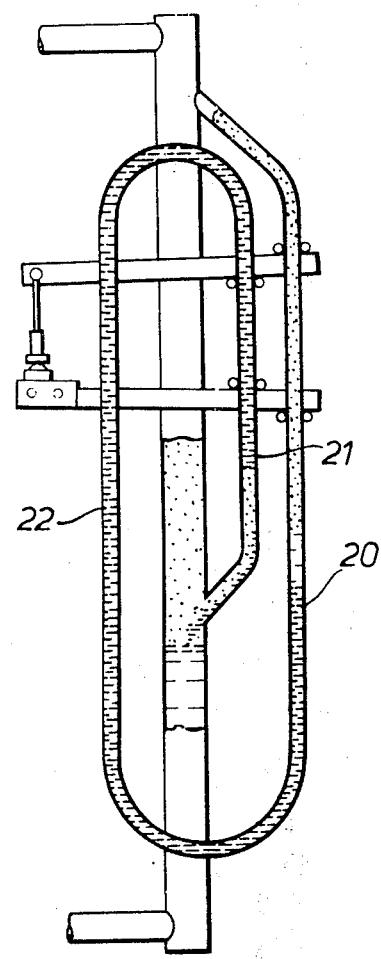

When the boiler water level reverts to the normal position 14 below the point 18, the water in column 21 is no longer supported, and some of it will drain out into the stack tube 10. An unbalanced condition now exists (see FIG. 5) because the column of water in column 22 is now longer and heavier than the combined columns in columns 20 and 21. Its movement downwards, due to gravity, tends to draw up the remaining water in column 21, as illustrated in FIG. 5. Equilibrium is again restored when the center column 21 is once more filled with steam and column 20 is filled with water, similar to the initial condition shown in FIG. 2. The heating of the section of the tube 21 between the pivots 28 and 32 with live steam and the cooling of the section 40 of the column 20 between the pivots 27 and 31 with water, reverses the expansion and contraction effect which initiated the high level warning. Levers 25 and 30 move apart, resetting the switch circuit, so that the warning condition is terminated.

The operation of the device to give a warning of a low water level condition will now be described. In this mode of use, the alarm is mounted so that the normal condition is, as shown in FIG. 4, with the water level above the point 18. The levers and switching circuit would be re-arranged so as to be quiescent, e.g., the tappet 26 would be adjusted so as to contact the switch 33. When the boiler water level fell below the low water limit at 18, the tappet 26 would no longer contact the switch 33 and the alarm would respond in the manner described in connection with FIG. 5 and produce the condition illustrated in FIG. 2. In this case, however, the arrangement of the switch circuit would cause a warning of a low water level to be given.

When the low level state ended and the water level rose again above 18, the action of the device would follow the sequence described in connection with FIGS. 3 and 4. The warning signal would be terminated and the "normal" state restored.

An arrangement may also be provided to give both high and low water level alarm warnings in one unit by providing a single stack tube 10 having two separate tube loops 16, one having its entry point 18 at a height corresponding to the high level limit while the second loop would have its entry point 18 below this, at a height representing the low water level limit.

Additional loops with alternative entry points may be included, if desired, to satisfy other functions at different water levels.

Thus for a low water level condition the first low level loop could be used to provide an audible or visual alarm. If this is ignored, a lower low level loop could be arranged to inactivate the boiler, for example by switching off the burners.

Similarly a higher high level loop could be used, e.g., to switch off the boiler feed water supply.

The mechanical movement of the levers may be adapted to operate alternative devices to the electrical switch mentioned above. A steam whistle or pneumatic valve, for instance, may be operated to give audible or visual warning of abnormal water level, or to initiate some function required under this condition, e.g. as mentioned above.

A change in the pressure of the steam corresponding to a change in the saturated steam temperature will not prevent the alarm from operating by altering the set point adjustment because, when brought into action, the cool water filled section of the tube becomes heated with steam while the steam filled column is cooled by being filled with water. This reversal of the temperature of the two operating sections 40 and 41 of the tubes ensures that the levers must always cross the datum point and operate the switch irrespective of the steam pressure and temperature.

Any change in the tappet setting due to a given change in steam temperature affecting both tube sections 40 and 41 can be minimized by making the operational length P of the tube section 40 longer than the equivalent length Q of the tube section 41 in the ratio:

$$P = \left\{ 1 + \frac{r}{R} \right\} \times Q$$

where $R$ is the distance from the pivot 32 to the switch 33 and $r$ is the distance from the pivot 31 to the pivot 32, as indicated in FIG. 1.

This equivalent triangle relationship compensates for variations in working temperature (i.e. pressure) so that the tappet does not need to be adjusted for changes in working pressure.

The expansion and contraction of sections 40 and 42 brought about by a change in water level may be employed independently without reference to each other in order to perform any desired function.

Figure 8:
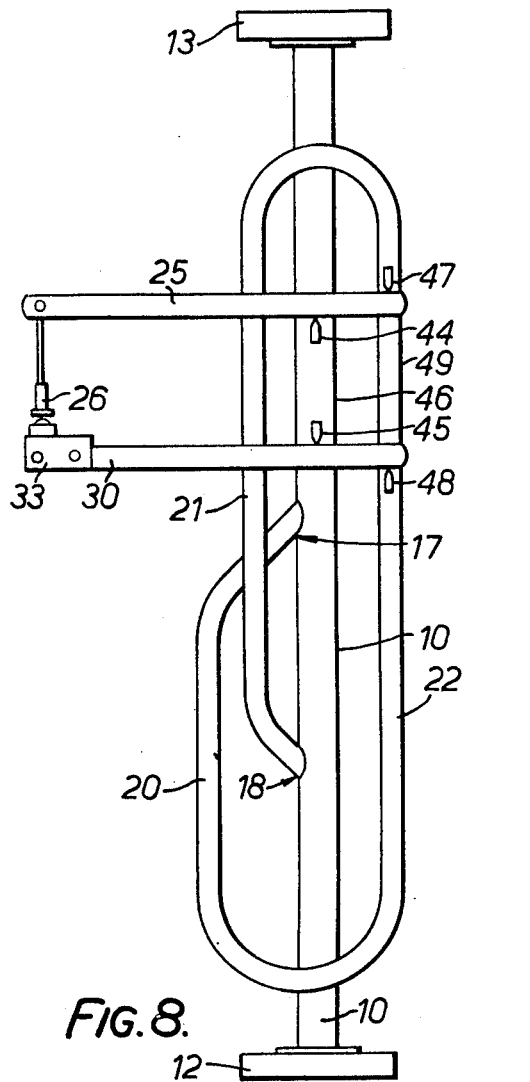
FIG. 8 is a view similar to FIG. 1 of another modified arrangement suitable for use as a low level alarm.

Thus, a further adaptation of the principle would be the provision of pivot points on the stack tube 10 or an independent tube which would be maintained at steam temperature between these points, even at the highest limit of water level, and have the same coefficient of expansion as the operating tube sections 40 and 41. The relationship between the separation of the pivots on each tube and the pairs of pivots is again arranged to compensate for steam pressure temperature variations, as in the earlier arrangements. Other methods of utilizing the expansion or contraction of sections of the tubes 20, 21 and 22 in conjunction with the stack tube as a reference base are illustrated in FIGS. 6, 7 and 8.

In these arrangements the normal condition is for the portion of the loop between the pivot points to be filled with water and the stack tube with steam. On moving to the alarm condition, the portion of the loop between the pivots is filled with steam and this produces a rapid response.

Figures 6, 7:
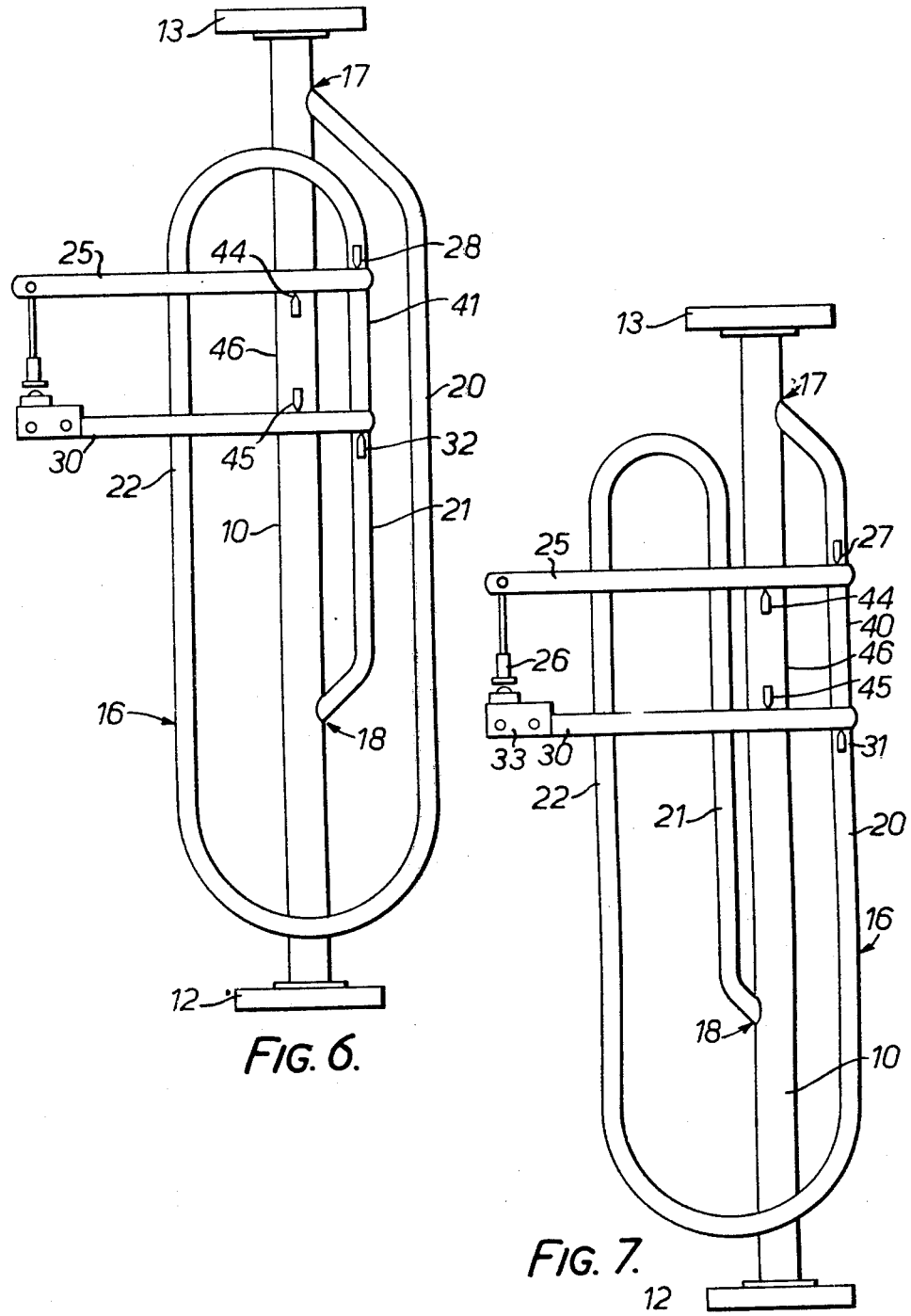
FIG. 6 is a view similar to FIG. 1 of a modified arrangement suitable for use as a low level alarm.
FIG. 7 is a view similar to FIG. 1 of another modified arrangement suitable for use as a high level alarm.

The arrangement shown in FIG. 6 would be most suitable as a low water level alarm. The normal water level would be above point 18, although always below the pivot points 44 and 45 attached to the stack tube 10. The section 41 of the tube 21 would be filled with water, as indicated in FIG. 4. When the water level fell below the point 18, the condition illustrated in FIG. 2 would be assumed. Section 41 would become filled with hot steam in place of cool water and would expand to the same length relationship as the section 46 of the stack tube between the pivots 44 and 45. Since the same steam would be filling both tubes 10 and 21, thus equalizing temperatures irrespective of steam pressure, the tappet adjustment for the switch 33 would be unaffected.

FIG. 7 illustrates a similar arrangement, but utilizes the stack tube 10 in conjunction with section 40 of tube 20. This arrangement is most suitable as a high water level warning device with the normal water level below point 18, as shown in FIG. 2. The section 40 is normally filled with condensed water at low temperature, while the switch levers are pivoted at 44 and 45 on an appropriate length of stack tube 10, which is normally filled with steam. When the water level in the stack tube 10 rises above point 18, the situation shown in FIG. 4 occurs. The section 40 of the tube 20 becomes filled with steam and expands due to the temperature rise to match the steam filled length 46 of stack tube between the pivot points 44 and 45. Tilting of the levers 25 and 30 brought about by this expansion operates the switch 33 to give the requisite warning signal.

In a preferred arrangement, a single stack tube is provided with a low water level loop arranged as described for FIG. 6 and with a high level loop arranged as described for FIG. 7.

FIG. 8 shows a third possible arrangement suitable for low water level warning. The normal water level is above point 18, but well below point 17. Normally, tubes 21 and 22 are filled with water similar to FIG. 4. The lever 25 is pivoted to the tube 22 at 47 and the lever 30 is pivoted to the tube 22 at 48. The section 49 of the tube 22 between the pivots 47 and 48 is normally in a cooled and contracted state. When the water level falls below point 18, steam will enter the tube 21 and the upper part of tube 22 down to the level of point 17 where tube 20 enters the stack tube 10. Since point 17 is below the section 49 of the tube 22, this length 49 between the pivots will expand on becoming filled with steam to match the section 46 of the stack tube 10 and again the levers will act to operate the switch 33.

Clearly, in each of the arrangements described, the arms could be arranged to extend out on the opposite side to that described.

Referring now to the remaining Figures, the same reference numerals will be used for the same parts.

Figure 9:
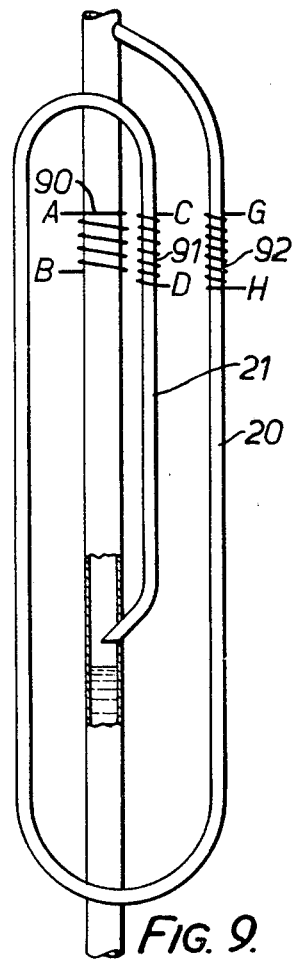

FIG. 9 shows a platinum wire coil 90 having terminals A and B located on the stack tube 10, a coil 91 having terminals C and D located on the portion 21 at the region 41, and a coil 92 having terminals G and H on the portion 20 at the region 40.

Figure 10:
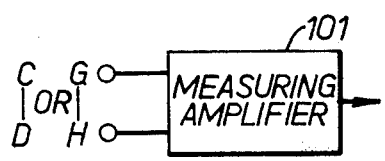
Figure 11:
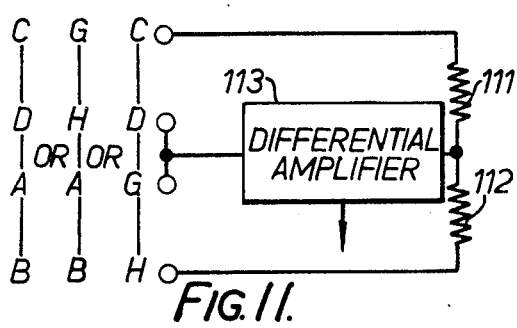

Any element which changes its resistivity with temperature or which generates an electrical signal with change in temperature may be used instead of the coils in FIGS. 10, 11 and 12, but in FIG. 12 the resistors may be omitted.

FIG. 10 shows an arrangement in which either coil 91 or coil 92 is connected directly to a measuring amplifier 101 to give a direct output reading of temperature or an output signal which is used to operate a switch or warning device.

FIG. 11 shows a bridge arrangement with two resistors 111 and 112 and a differential amplifier 113. The terminals of coil 90 (stack tube) and coil 91 cooling tube are connected across the bridge or the pair coil 90 and 92 or the pair coil 91 and coil 92. Voltages developed across the bridge are changed substantially with temperature change in the loop giving an alarm output indication or electrical signal directly or operating a signal device.

FIG. 12 shows a modification of this arrangement.

Figure 15:
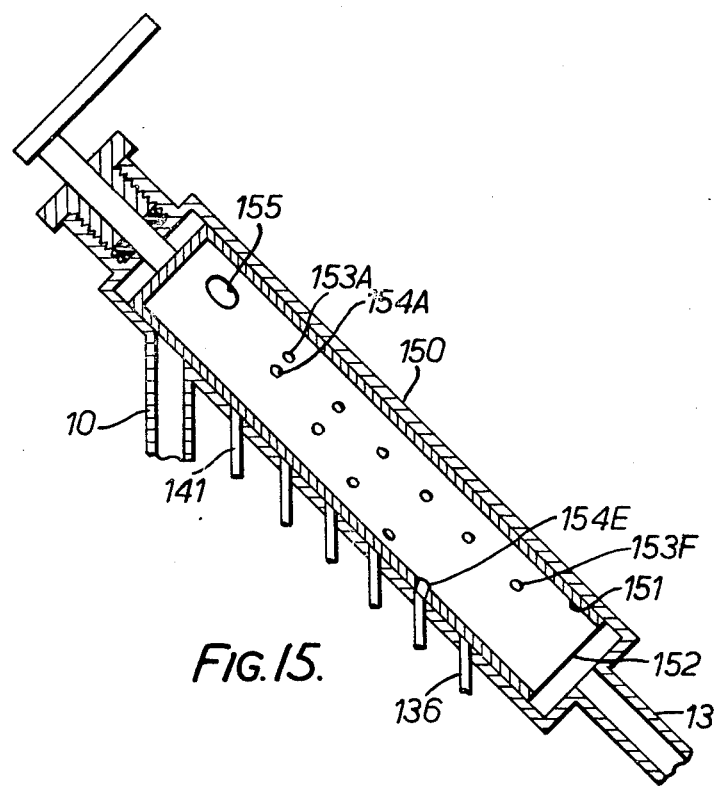

FIGS. 13 to 15 show a modified arrangement in which the stack tube 10, instead of being vertical, is arranged with a lower inclined portion 130, an intermediate vertical portion 131 and an inclined "blow down" valve manifold 150 (shown in more detail in FIG. 15).

The arrangement connects with a boiler drum 11 via a valve 133 in the upper connector tube 13 and a valve 132 in the lower connector tube 12. A drain tube 134 and drain valve 135 extend down from the connector 12.

Multiple cooling tube loops 136 to 141 are disposed vertically between the lower inclined limb 130 of the stack tube and the valve manifold 150. This provides for more accurate detection of exactly what the level is in the boiler.

As shown in FIG. 15, the manifold 150 has a rotatable inner sleeve 151 open at its end 152 facing the valve 133 and closed at its other end. The sleeve has two sets of six spaced apart apertures 153A to F and 154A to F. The apertures 153 are arranged to place the inside of the sleeve 151 in communication with all the tubes 136 to 141 simultaneously. A further aperture 155 in the sleeve 151 is at the same time brought into communication with the stack tube 131. The apertures 154A to F are arranged on a line inclined to the axis of the sleeve 151 so that a single cooling tube, e.g. 137 in FIG. 15, only can be brought into communication with the interior of the sleeve 151 at a time while the stack tube 131 is cut off. When the sleeve 151 is in the position shown in FIG. 15, the tube 137 can be cleared of any scale or debris and blown out with steam by closing the valve 132, opening the valve 135 and opening the valve 133. Steam then passes from the boiler up the tube 13, through the sleeve 151, down and round the tube 137, down the tube 130 and out of the drain tube 134. Each tube 136 to 141 can be blown out in turn.

For normal use the sleeve 151 is positioned so that all the holes 155 and 153A to F are in register with the tubes 131 and 136 to 141 and the valves 132 and 133 are open and the valve 135 is closed.

The lever arrangement of FIG. 1 to 8 or the arrangements of FIGS. 9 to 12 can be used to sense a change of state for each tube 136 to 141.

Figure 16:
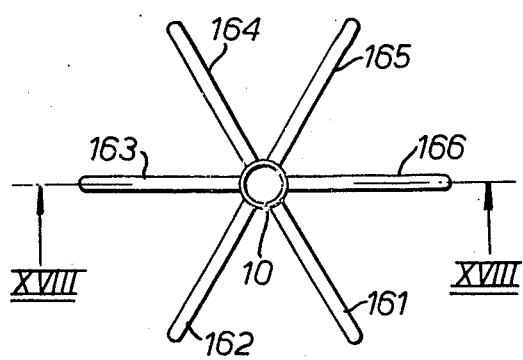
Figure 17:
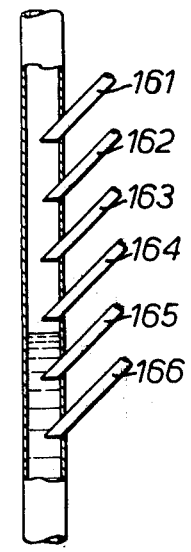

FIGS. 16 to 18 show an arrangement with a vertical stack tube 10 and radially extending cooling tubes 161 to 166. This similarly provides for more accurate determination of the water level as in the arrangement shown in FIGS. 13 to 15. Either lever or coil arrangements could be used to sense temperature changes in the tubes with the levers extending outwardly. A similar blow down manifold to that shown in FIG. 15 could be incorporated in this arrangement.

FIG. 19 shows a further alternative configuration for the cooling tube loop.

Figure 21:
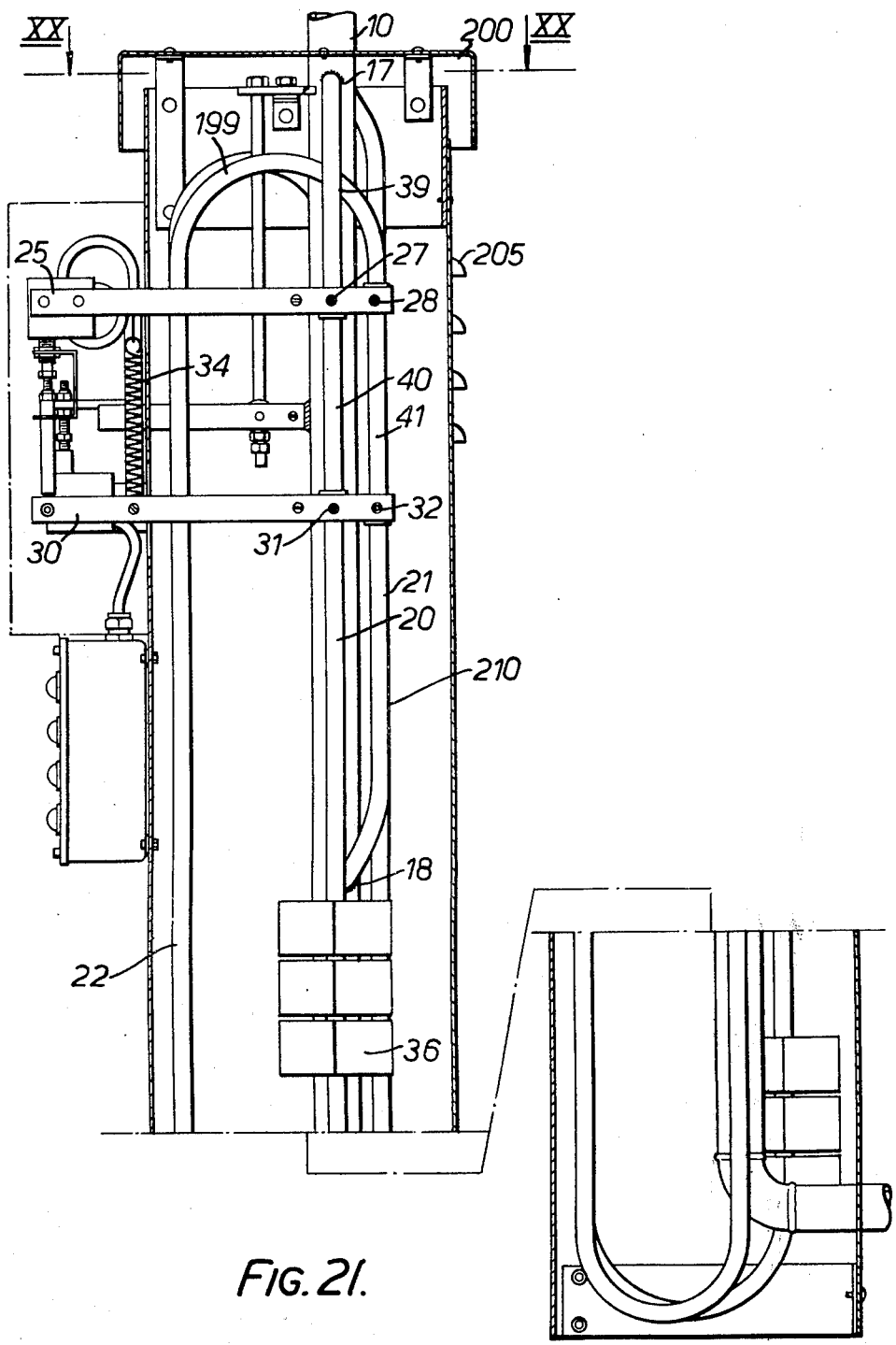
Figure 22:
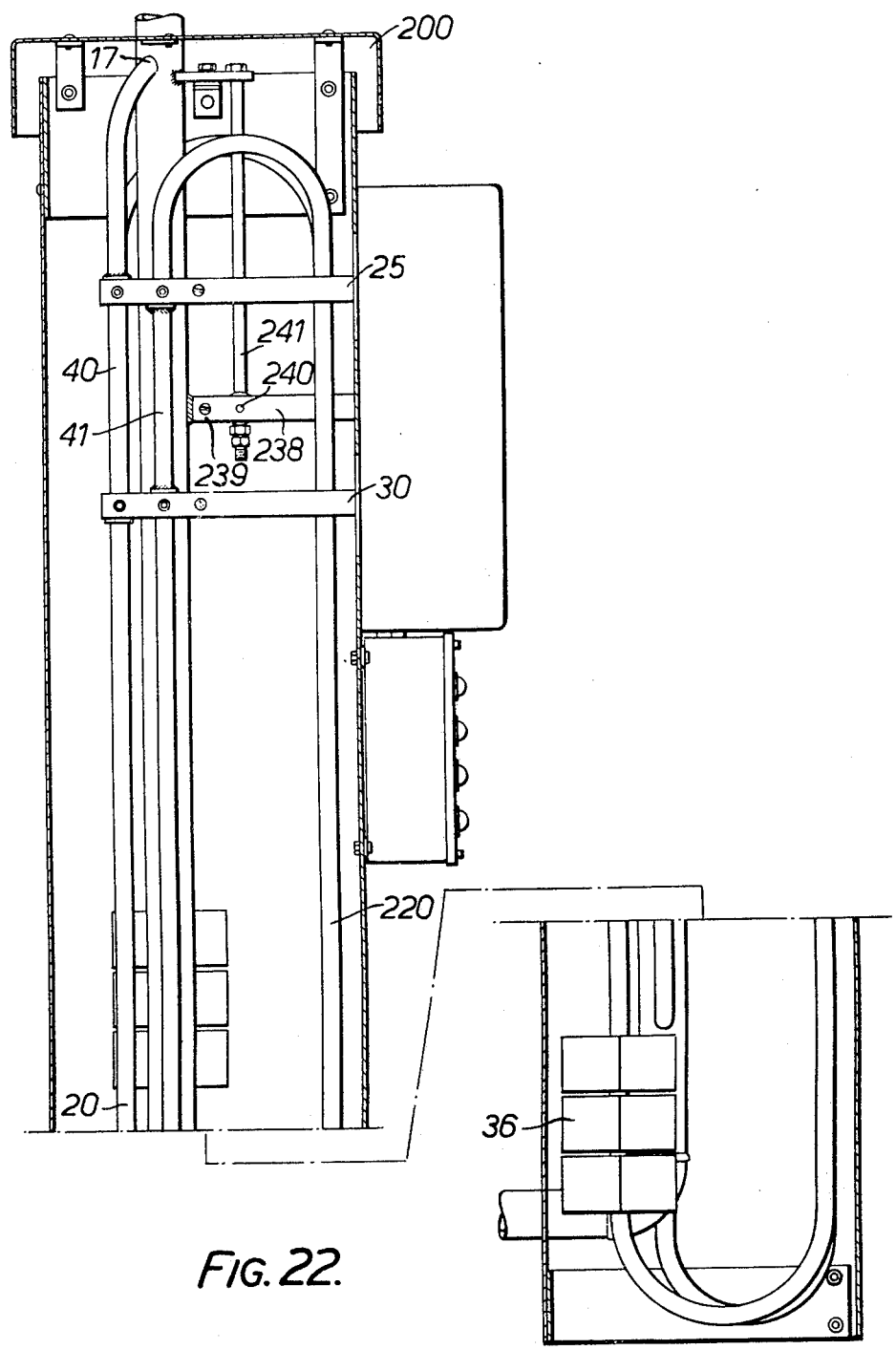
Figure 23:
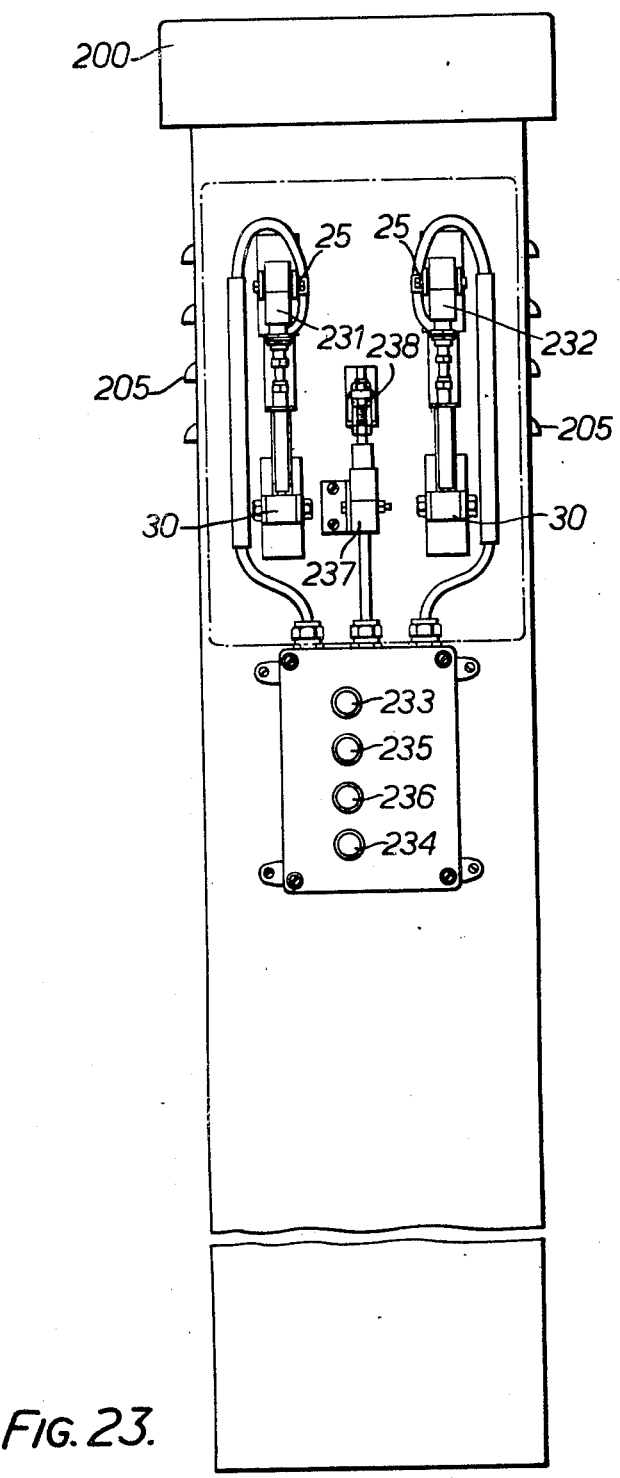

FIGS. 21 to 23, show on approximately one-fourth scale a preferred form of the device.

The arrangement has a central vertical stack tube 10 of stainless steel with a 1 inch internal diameter and is provided with flanged or butt welded top and bottom connectors.

As can be seen in FIG. 20, the device is housed within an open bottomed sheet metal housing 201 having a cover 200 (removed in FIG. 20) by suitable brackets 202, 203, 204 welded to the stack tube 10. A pair of cooling tubes 210, the high level loop, and 220, the low level loop, are disposed on either side of the stack tube 10 within the housing 201. The housing 201 has rear and side cooling vents 205. Both loops have cooling fins 36, for tube 210 secured about one-third of the way from the bottom of the downwardly extending portion 20, and for tube 220 secured close to the bottom of the downwardly extending portion 20.

The high level tube 210 is provided with a pair of levers 25 and 30 pivoted in the reverse sense to that shown in FIG. 1 so that the normal condition is for the levers to be together and held together by the spring 34. When the alarm condition occurs the levers move apart against the spring such that any failure of the spring results in the alarm sounding.

The loop 210 starts at the upper vapour inlet 17, extends out sideways and downwards parallel to the front of the device, then curves out around the top 199 of the loop between the portions 22 and 21, and then back inwardly to run down vertically and parallel to the stack tube 10 forming the portion 20. This portion has welded on shoulders in which the pivots 27 and 31 for the levers 25 and 30 are formed. The portion 20 carries three cooling fins 36 located just below the high water level inlet 18. The portion 20 then extends below level 18 and curves through 180° in the vertical plane and 90° in the horizontal plane and back up vertically parallel to the stack tube to form the portion 22. The plane of the portions 20 and 21 is at right angles to the front of the device. At its end 199, the portion 22 curves through 180° in the vertical plane and underneath the portion 39 and through to behind the stack tube. The cooling tube then extends down vertically parallel to the stack tube about half way down the length of the stack tube forming the portion 21. It then curves inwardly back to the stack tube making an angle of about 70° with the plane of the portions 20 and 22, and communicating with the stack tube via the lower inlet 18. The upper portion of the tube 21 is also provided with welded on shoulders in which the pivots 28 and 32 for the levers 25 and 30 are formed.

The low level tube, 220 (see FIG. 22) is provided similarly with a pair of levers 25 and 30, this time positioned in the same sense as FIG. 1, but since FIG. 1 is a high level configuration, again having as their normal condition the levers together, the levers moving apart when an alarm condition occurs.

The loop 220 starts at the upper vapour inlet 17 and extends backwards at an angle of about 110° to the plane of the tube 220, and then extends down vertically parallel to the stack tube forming the portion 20 and carrying three cooling fins 36 at its lower end. At its upper end, it is provided with similar shoulders for the pivots as described for loop 210. The portion 20 then curves round 180° and up in front of the stack tube forming the portion 22, then curves round 180° and down vertically parallel to and beside the stack tube to form the portion 21 and then turns inwardly through 90° to communicate with the stack tube via the inlet 18 at a point about one-fifth from the bottom of the loop.

Both loops are about 320 units long and about 0.8 units internal diameter, ie. the ratio of length to internal diameter is about 260 : 1 or more broadly in the range of 50:1 to 1000:1 or 200:1 to 400:1.

The loops are desirably both made of the same material as the stack tube so as to eliminate effects due to different coefficients of expansion.

As can be seen from FIG. 23, the levers 25 and 30 operate a pair of microswitches 232 and 231, which in turn control a high level alarm lamp 233 and low level alarm lamp 234. The "on" lamp 235 indicates that the switch circuits are live and the "ready" lamp 236 indicates that the apparatus is in the normal state.

The lamp 236 is controlled by a further microswitch 237 mounted on the housing 201 which senses when the stack tube is at elevated temperature and activates the alarm circuitry. This switch measures the length of the stack tube. The tappet for the switch 237 is mounted on a lever 238 pivoted to the stack tube at 239 and pivotally connected at 240 to a rod 241 connected at its upper end to the stack tube. The top of the rod 241 passes through a hole in a plate attached to the stack tube and a nut is attached to the top of the rod, thus permiting the rod to move up through the hole but not to move down through the hole. The switch 237 and lever 238 are held together by a spring. Thus, when the stack tube is cold the lever 238 is depressed, and the switch 237 is open; when the stack tube 10 heats up the lever 238 and its tappet are pulled up by the rod 241 and thus separated from the switch 237, which thus closes, activating the alarm circuits.

The device is suitable for use in marine applications and the feature of the vertical stack tube ensures that false operation of the device is not caused by the movement of the ship which with an inclined tube could occur. When the arrangement of FIGS. 13 to 15 is used in a ship, the inclined limb 130 of the stack tube should be arranged in the fore and aft direction.

What I claim as my invention and desire to secure by Letters Patent is:

1. A liquid level detecting device adapted for use with a vapour generator comprising a stack tube having a lower liquid inlet, an upper vapour inlet, lower connector means for attaching the lower liquid inlet to the vapour generator at a level below the operating liquid level thereof, upper connector means for attaching the upper vapour inlet to the vapour generator at a level above the operating liquid level thereof, and at least one cooling tube with one end communicating with the stack tube at an upper cooling tube inlet and the other end communicating with the stack tube at a lower cooling tube outlet at a level above the stack tube liquid inlet, each cooling tube changing direction at least twice between its inlet and outlet so as to provide at least a first portion extending down from the upper cooling tube inlet to a region below the lower cooling tube outlet, a third portion extending up from the lower cooling tube outlet to a region adjacent the upper cooling tube inlet, and a second portion interconnecting said first and third portions, the first, second and third portions of the cooling tube being disposed relative to the stack tube so that when the stack tube is in use, the first, second and third portions are disposed so that the lower ends of said first and second portions together afford a generally U-shaped collecting region in which any liquid formed by condensation of vapour in said first and second portions will collect in said collecting region, and at least one sensing device located in sensing relationship to at least one of said first, second and third portions and arranged to sense the change in temperature of said portion and to produce a signal in response to sensing a change of temperature of a predetermined magnitude.

2. A device as claimed in claim 1 in which the first, second and third portions are straight and are arranged parallel to the stack tube.

3. A device as claimed in claim 2 characterized in that the said sensing device comprises an actuating member which is pivoted to the first or third portion of the said cooling tube and the device which is to be actuated is mounted on a carrier member pivoted to the same portion of the said tube, at a spaced apart location, the arrangement being such that the actuating member actuates the device when the temperature of the portion of the cooling tube to which it is pivoted changes.

4. A device as claimed in claim 3 characterized in that the actuating member and the carrier member are each pivoted to the first and third portions of the cooling tube.

5. A device as claimed in claim 3 characterized in that the actuating member and the carrier member are each pivoted to the first portion of the cooling tube and to the stack tube.

6. A device as claimed in claim 1 in which at least two cooling tubes are provided, each cooling tube has independent sensing devices, one tube, the high water level cooling tube, has its lower cooling tube outlet communicating with the stack tube at what will be the high water level in use, and the other tube, the low water level cooling tube, has its lower cooling tube outlet communicating with the stack tube at what will be the low water level in use.

7. A stationary or marine vapour generator having a generator drum in which vapour is generated and a liquid level detecting device as claimed in claim 6 attached to said drum, the stack tube of the said device being arranged substantially vertically, the stack tube vapour inlet communicating with the interior of the generator drum at a level above the high water level of the vapour generator and the stack tube liquid inlet communicating with the interior of the generator drum at a level below the low water level of the vapour generator, the detecting device being positioned relative to the drum so that the lower cooling tube outlet of the low water level cooling tube is at the low water level of the drum and the lower cooling tube outlet of the high water level cooling tube is at the high water level.

8. A device as claimed in claim 1 characterized in that at least two cooling tubes are provided and a valve device is provided for selectively connecting the upper cooling tube inlet of each cooling tube to the vapour inlet of the stack tube whilst shutting off the stack tube from the said vapour inlet and a drain provided with a valve is located below the lower cooling tube outlet.

9. A device as claimed in claim 8 characterized in that valve device comprises a valve manifold having an inner sleeve open at one end to the vapour inlet of the stack tube and having at least one series of ports such that in one position of the sleeve the vapour inlet of the stack tube is brought into communication with the stack tube and all the upper cooling tube inlets whilst in other positions the vapour inlet of the stack tube is brought into communication with only one of the upper cooling tube inlets in each such other position.

10. A device as claimed in claim 9 characterized in that the stack tube has an inclined lower limb affording the lower liquid inlet, a vertical intermediate limb communicating with the said valve device affording the upper vapour inlet and at least two cooling tubes disposed between the lower limb and the said valve device.

11. A device as claimed in claim 1, further characterized by alarm devices controlled by the said sensing devices and further being under the control of a further sensing device which activates the said alarm devices only when the stack tube contains steam.

12. A liquid level detecting device adapted for use with a vapour generator comprising a stack tube having a lower liquid inlet with a connector for attachment to the said vapour generator at a level below the operating liquid level thereof and an upper vapour inlet with a connector for attachment to the vapour generator at a level above the operating liquid level thereof, a high level cooling tube arranged as a loop having one end communicating with the stack tube at an upper high level cooling tube inlet and the other end communicating with the stack tube at a lower high level cooling tube outlet at the level above which the water level of the vapour generator must not pass without an alarm being given, the said cooling tube having a first portion extending parallel to the stack tube to below the cooling tube outlet a second portion extending up therefrom parallel to the stack tube to above the cooling tube outlet and a third portion extending therefrom down parallel to the stack tube to the cooling tube outlet, a pair of levers pivoted to the said first and third portions, sensing means cooperating with said levers to sense movement thereof; and alarm means connected to said sensing means and arranged to give an alarm signal when said sensing means sense movement of the levers, a low level cooling tube arranged as a loop having one end communicating with the stack tube at an upper low level cooling tube inlet and the other end communicating with the stack tube at a lower low level cooling tube outlet at the level below which the water level of the vapour generator must not pass without an alarm being given, the said cooling tube having a first portion extending parallel to the stack tube to below the cooling tube outlet a second portion extending up therefrom parallel to the stack tube to above the cooling tube outlet and a third portion extending therefrom down parallel to the stack tube to the cooling tube outlet, a pair of levers pivoted to the said first and third portions, sensing means cooperating with said levers to sense movement thereof, and alarm means connected to said sensing means and arranged to give an alarm signal when said sensing means sense movement of the levers.

13. A device as claimed in claim 12 in which one end of the levers on the high level loop carry the said sensing means and the levers are pivoted at the other end on the third portion and intermediate the two ends on the first portion of the loop, and one end of the levers on the low level loop carry the said sensing means and the levers are pivoted at the other end on the first portion and intermediate the two ends on the third portion.

* * * * *